United States Patent [19]
Asano et al.

[11] Patent Number: 5,991,721
[45] Date of Patent: *Nov. 23, 1999

[54] APPARATUS AND METHOD FOR PROCESSING NATURAL LANGUAGE AND APPARATUS AND METHOD FOR SPEECH RECOGNITION

[75] Inventors: Yasuharu Asano, Kanagawa; Masao Watari, Ibaragi; Makoto Akabane, Tokyo; Tetsuya Kagami, Chiba; Kazuo Ishii, Kanagawa; Miyuki Tanaka, Tokyo; Yasuhiko Kato; Hiroshi Kakuda, both of Kanagawa; Hiroaki Ogawa, Tokyo, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/654,893

[22] Filed: May 29, 1996

[30] Foreign Application Priority Data

May 31, 1995 [JP] Japan ..................................... 7-133762

[51] Int. Cl.[6] ................................. G10L 5/06; G10L 9/00
[52] U.S. Cl. ........................... 704/257; 704/255; 704/239
[58] Field of Search ............................... 704/1–2, 9, 239, 704/240, 241, 251, 255, 257

[56] References Cited

U.S. PATENT DOCUMENTS

| | | | |
|---|---|---|---|
| 4,592,085 | 5/1986 | Watari et al. | 381/43 |
| 5,003,601 | 3/1991 | Watari et al. | 381/43 |
| 5,301,257 | 4/1994 | Tani | 395/11 |
| 5,355,432 | 10/1994 | Tanaka et al. | 395/2.43 |
| 5,390,280 | 2/1995 | Kato et al. | 395/2.42 |
| 5,848,389 | 12/1998 | Asano et al. | 704/239 |

FOREIGN PATENT DOCUMENTS 3-276367  12/1991  Japan ............................. G06F 15/38

*Primary Examiner*—Forester W. Isen
*Assistant Examiner*—Patrick N. Edouard
*Attorney, Agent, or Firm*—Limbach & Limbach L.L.P.

[57] ABSTRACT

An apparatus and a method for processing a natural language arranged so as to improve the speech recognition rate. In an example search section, the degree of similarity between each of a plurality of examples of the actual use of the language stored in an example data base and each of a plurality of probable recognition results output from a recognition section, and one of the examples corresponding to the highest degree of similarity is selected. A final speech recognition result is obtained by using the selected example. The example search section calculates the degree of similarity by weighting the degree of similarity on the basis of a context according to at least one of the examples previously selected.

29 Claims, 6 Drawing Sheets

FIG. 3

| EXAMPLE IMMEDIATELY BEFORE | EXAMPLES LIKELY TO BE USED NEXT |
|---|---|
| CHEKKU-IN WO ONEGAI-SHIMASU (I'D LIKE TO CHECK-IN, PLEASE.) | OKYAKU-SAMA NO ONAMAE WO DOUZO (MAY I HAVE YOUR NAME, PLEASE?) <br> GOYOYAKU WA SARETE IMASUKA (IS YOUR RESERVATION MADE?) <br> KONO YOUSHI NI GOKINYUU WO ONEGAI SHIMASU (PLEASE FILL IN THIS FORM.) |
| HEYA WA ARI-MASUKA (DO YOU HAVE A ROOM AVAILABLE?) | GOZAI-MASU ((YES, WE DO.) <br> GOZAI-MASEN (NO, WE DON'T.) <br> MANSHITU-DESU (WE ARE FULLY BOOKED.) |
| ----- | ----- |

APPARATUS AND METHOD FOR PROCESSING NATURAL LANGUAGE AND APPARATUS AND METHOD FOR SPEECH RECOGNITION

BACKGROUND OF THE INVENTION

1. Field of the Invention

The present invention relates to an apparatus and a method for processing a natural language and an apparatus and a method for speech recognition which are suitably used, for example, for processing a language input in a literal or speech form to recognize or translate it.

2. Description of the Related Art

Many studies have been made about processing written languages and spoken languages used by human beings (generally referred to as natural language processing, hereinafter) by using, for example, a computer or the like. In natural language processing methods used in many of these studies, however, various phenomena of language occurring in natural language are previously described in an abstract form, i.e., as grammatical rules by specialists and are processed on the basis of such rules. The processing methods therefore entail a problem due to the difficulty in describing grammatical rules.

That is, it is almost impossible even for a specialist to describe abstract grammatical rules such as to completely cover various phenomena of language occurring in processes of communication between human beings. Therefore, some expression of language not covered by the grammatical rules may be erroneously processed. Generally, one who finds a phenomenon of language does not well know how to modify the corresponding grammatical rules. If the grammatical rules are modified, a bad effect may result such that phenomena of language normally processable before modification become impossible to process.

Recently, as a fundamental means for solving this problem, natural language processing using examples of the actual use of a language has been studied extensively. This kind of processing is based on the method of preparing an example data base in which a large number of examples of the actual use of a language are registered instead of abstract grammatical rules, searching the example data base for one of the examples similar to input text data to be processed and performing natural language processing on the basis of the example searched out.

For example, Japanese Patent Laid-Open Publication No. 276367/1991 discloses an example-initiative machine translation system to which such natural language processing is applied. In this machine translation system, a large number of sets of examples of original sentences and examples of corresponding translations are registered in an example data base. When an original sentence written in a predetermined language is input as an input sentence, the example data base is searched for the example most similar to the original sentence. The original sentence is translated according to the corresponding translation of the example thereby obtained.

In the case of speech language processing to which natural language processing using examples of the actual use of a language is applied, an ordinary speech recognition apparatus is used to determine a result of recognition of input speech, an example data base is searched for one of the examples most similar to the speech recognition result obtained as an input sentence, and translation or the like is performed by using the example searched out.

If a natural language is used as a communication means between human beings, a sentence in a flow of conversation ordinary has such a meaning as to reflect the flow before the sentence, which should be called the context or background of conversation. Therefore, the context (conversation background) is thought to be an important factor of natural language processing.

The conventional methods of using examples of the actual use of a language, however, entail a problem described below. When one of examples of the actual use of a language used to process an input sentence is searched for, the degree of similarity between the input sentence and the examples is calculated only with respect to the similarity of the meanings of the words thereof defined in a thesaurus in which words are hierarchized as elements of a tree structure on the basis of the similarity of their meanings (concepts). Also, the context is not taken into consideration. As a result, it is uncertain whether an example searched out is truly suitable for processing the input sentence.

In the conventional speech language processing, speech recognition processing of a language is performed before processing of another natural language, a speech recognition result thereby obtained is determined, and an example of the actual use of the language most similar to the speech recognition result is searched for. Natural language processing such as machine translation is performed by using the example thereby found. In this processing, therefore, it is difficult to obtain a correct translation result if the speech recognition result is erroneous.

Further, in the conventional speech language processing, the probability or likelihood of probable speech recognition results by speech recognition processing is not taken into consideration. Therefore, it is also uncertain whether an example searched out with respect to an input sentence is truly suitable for processing the input sentence.

SUMMARY OF THE INVENTION

In view of these circumstances, an object of the present invention is to provide an apparatus and a method for processing a natural language which make it possible to select an example of the actual use of the language more suitable for processing an input sentence, and which improve the accuracy of natural language processing.

To achieve this object, according to one aspect of the present invention, there is provided a natural language processing apparatus comprising example storage means for storing a plurality of examples of the actual use of a language, and selection means for calculating the degree of similarity between an input sentence and each of the examples stored in the example storage means and for selecting the example corresponding to the highest degree of similarity, wherein the selection means calculates the degree of similarity by weighting some of the example one of which is to be next selected, the weighting being performed on the basis of a context according to at least one of the examples previously selected.

In this natural language processing apparatus, the example storage means may further store prediction information for predicting some of the examples likely to be used for the next processing, and the selection means may perform weighting on the basis of the prediction information. Also, the example storage means may store as prediction information a group of information in which the example presently used for processing is related to some of the examples likely to be used for the next processing, and the selection means may perform weighting so that the degree of similarity of some of the examples related the example used in the preceding processing becomes higher or the degree of similarity of some of the examples not related the example used in the preceding processing becomes lower. The example storage means may store a group of information in which some of the examples likely to be used for the next processing are related to one of the examples presently used, the group of information being obtained by learning. Further, the example storage means may store the prediction information by sorting the examples in the prediction information into groups of examples used in correspondence with predetermined places, and the selection means may use the prediction information according to each of the predetermined places.

According to another aspect of the present invention, there is provided a method of processing a natural language using a natural language processing apparatus which has example storage means having a plurality of examples of the actual use of the language stored therein, and which processes an input sentence by using one of the examples most similar to the input sentence. The method comprises the steps of calculating the degree of similarity between the input sentence and each of the examples stored in the example storage means and selecting the example corresponding to the highest degree of similarity. In the calculation step, the degree of similarity is calculated by performing weighting on the basis of a context according to at least one of the examples previously selected.

According to still another aspect of the present invention, there is provided a speech recognition apparatus comprising extraction means for extracting at least one feature parameter of a speech in a language by acoustically analyzing the speech, probable recognition result calculation means for obtaining a plurality of probable recognition results and the likelihood of each of the probable recognition result by recognizing the speech on the basis of the feature parameter output from the extraction means, example storage means for storing a plurality of examples of the actual use of the language, linguistic similarity calculation means for calculating the degree of linguistic similarity between each of the plurality of probable recognition results and each of the examples stored in the example storage means, integrated similarity calculation means for calculating the degree of integrated similarity between each of the plurality of probable recognition results and each of the examples stored in the example storage means on the basis of the degree of linguistic similarity and the likelihood, selection means for selecting one of the examples corresponding to the highest degree of integrated similarity, and recognition result calculation means for obtaining a result of recognition of the speech on the basis of the example selected by the selection means.

In this speech recognition apparatus, the integrated similarity calculation means may calculate the degree of integrated similarity by adding the degree of linguistic similarity and the likelihood in a predetermined ratio. Also, the integrated similarity calculation means may dynamically change the ratio in which the degree of linguistic similarity and the likelihood are added.

According to a further aspect of the present invention, there is provided a speech recognition method using a speech recognition apparatus which has example storage means for storing a plurality of examples of the actual use of a language and which performs sentence speech recognition, the method comprising the steps of extracting at least one feature parameter of a speech by acoustically analyzing the speech, obtaining a plurality of probable recognition results and the likelihood of each of the probable recognition result by recognizing the speech on the basis of the feature parameter, calculating the degree of linguistic similarity between each of the plurality of probable recognition results and each of the examples stored in the example storage means, calculating the degree of integrated similarity between each of the plurality of probable recognition results and each of the examples stored in the example storage means on the basis of the degree of linguistic similarity and the likelihood, selecting one of the examples corresponding to the highest degree of integrated similarity and obtaining a result of recognition of the speech on the basis of the example selected.

These and other objects and features of the present invention will become apparent from the following detailed description of preferred embodiments of the invention with reference to the accompanying drawings.

BRIEF DESCRIPTION OF THE DRAWINGS

FIG. 3 is a diagram showing a table stored in example data base 8;

DESCRIPTION OF THE PREFERRED EMBODIMENTS

Figure 1:
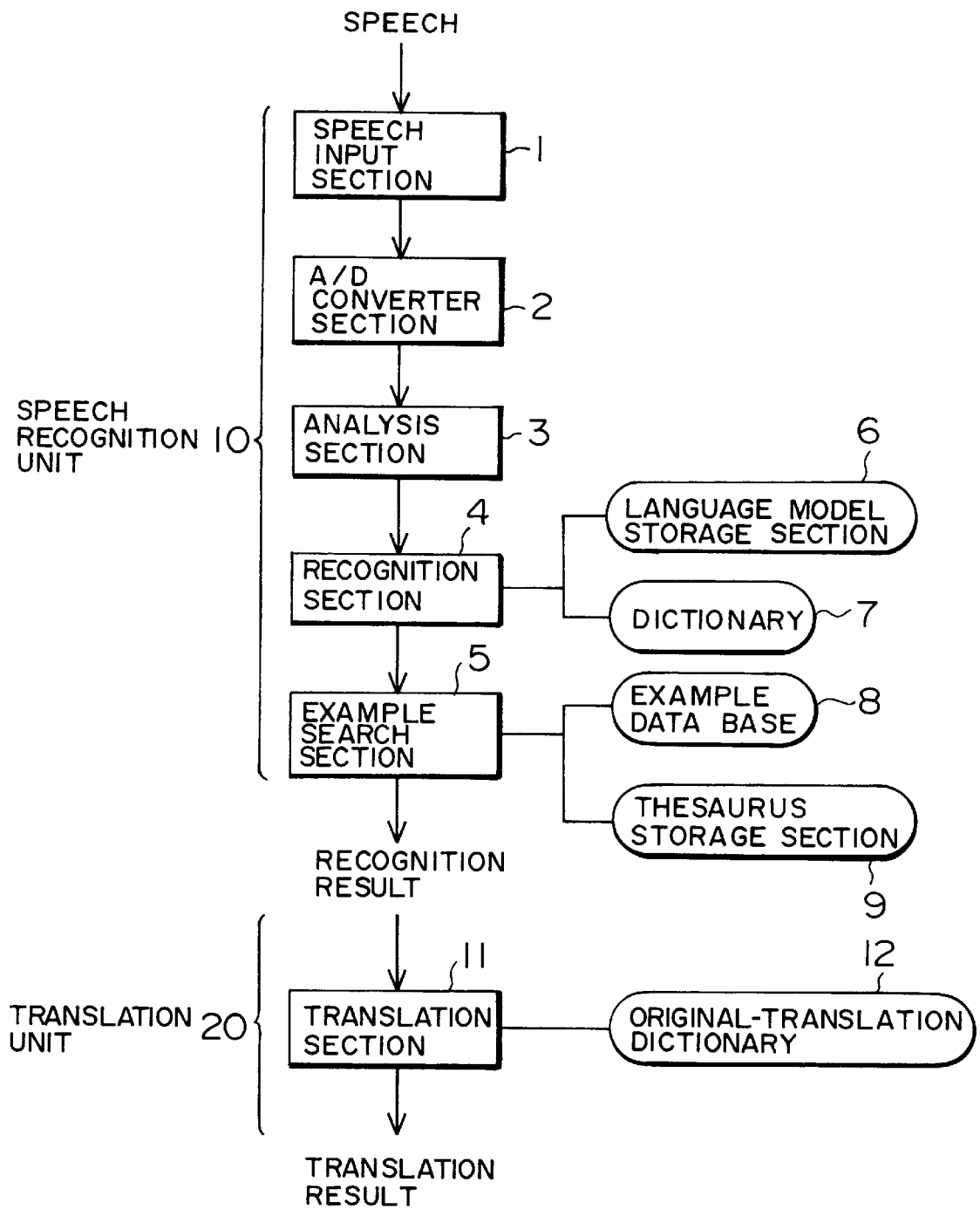
FIG. 1 is a block diagram showing the construction of a first embodiment of a speech translation apparatus to which the present invention is applied.

In the following are disclosed, as preferred embodiments of the present invention, systems in which a sentence uttered in Japanese or English is recognized and the result of this recognition is translated into English or Japanese.

To clarify the correspondence between the means of the present invention set forth in the claims and the embodiments described below, the features of the present invention will be described with respect to each means by indicating the corresponding embodiment (with only one example of the means) in parentheses following the characters denoting the means.

That is, a natural language processing apparatus as set forth in claim 1 is an apparatus which processes an input sentence by using an example of the actual use of the language most similar to the input sentence. This apparatus comprises example storage means (e.g., example data base 8 shown in FIG. 1) for storing a plurality of examples of the actual use of the language including the above-mentioned example, and selection means (e.g., example search section 5 shown in FIG. 1) for calculating the degree of similarity between the input sentence and each of the examples stored in the example storage means and for selecting the example corresponding to the highest degree of similarity. Specifically, the selection means calculates the degree of similarity by weighting some of the example one of which is to be next selected. This weighting is performed on the basis of a context according to at least one of the examples previously selected.

A natural language processing method as set forth in claim 6 is a method using a natural language processing apparatus which has example storage means (e.g., example data base 8 shown in FIG. 1) having a plurality of examples of the actual use of the language stored therein, and which processes an input sentence by using one of the examples most similar to the input sentence. The method comprises the steps of calculating the degree of similarity between the input sentence and each of the examples stored in the example storage means, and selecting the example corresponding to the highest degree of similarity. Specifically, to select the example corresponding to the highest degree of similarity, the degree of similarity is calculated by performing weighting on the basis of a context according to at least one of the examples previously selected.

A speech recognition apparatus as set forth in claim 7 is an apparatus for performing sentence speech recognition comprising extraction means (e.g., analysis section 3 shown in FIG. 5) for extracting at least one feature parameter of a speech in a language by acoustically analyzing the speech, probable recognition result calculation means (e.g., recognition section 14 shown in FIG. 5) for obtaining a plurality of probable recognition results and the likelihood of each of the probable recognition result by recognizing the speech on the basis of the feature parameter output from the extraction means, example storage means (e.g., example data base 8 shown in FIG. 5) for storing a plurality of examples of the actual use of the language, linguistic similarity calculation means (e.g., processing step S12 of a program shown in FIG. 6) for calculating the degree of linguistic similarity between each of the plurality of probable recognition results and each of the examples stored in the example storage means, integrated similarity calculation means (e.g., processing step S13 of a program shown in FIG. 6) for calculating the degree of integrated similarity between each of the plurality of probable recognition results and each of the examples stored in the example storage means on the basis of the degree of linguistic similarity and the likelihood, selection means (e.g., processing step S14 of a program shown in FIG. 6) for selecting one of the examples corresponding to the highest degree of integrated similarity, and recognition result calculation means (e.g., example search section 15 shown in FIG. 15) for obtaining a result of recognition of the speech on the basis of the example selected by the selection means.

A speech recognition method as set forth in claim 10 is a method using a speech recognition apparatus which has example storage means (e.g., example data base 8 shown in FIG. 5) for storing a plurality of examples of the actual use of a language and which performs sentence speech recognition. The method comprises the steps of extracting at least one feature parameter of a speech by acoustically analyzing the speech, obtaining a plurality of probable recognition results and the likelihood of each of the probable recognition result by recognizing the speech on the basis of the feature parameter, calculating the degree of linguistic similarity between each of the plurality of probable recognition results and each of the examples stored in the example storage means, calculating the degree of integrated similarity between each of the plurality of probable recognition results and each of the examples stored in the example storage means on the basis of the degree of linguistic similarity and the likelihood, selecting one of the examples corresponding to the highest degree of integrated similarity and obtaining a result of recognition of the speech on the basis of the example selected.

Needless to say, this description is not intended to limit the means of the present invention to those described above.

FIG. 1 shows the construction of a speech translation apparatus to which the present invention is applied. This speech translation apparatus is mainly constituted by a speech recognition unit 10 for recognizing speech and a translation unit 20 for translating the result of speech recognition into a predetermined language. For example, the speech recognition unit 10 is arranged so as to be capable of recognizing speech in each of Japanese and English (conversational speech recognition or speech understanding). Also, the translation unit 20 is arranged so as to be capable of translating an expression input in Japanese into an expression in English and also capable of translating an expression input in English into an expression in Japanese. Accordingly, this speech translation apparatus is capable of both translating an expression input in Japanese into an expression in English and translating an expression input in English into an expression in Japanese.

A speech input section 1 has a device for transforming a speech, i.e., waves of air, into a speech signal, i.e., electrical waves, e.g., a microphone, and an amplifier for amplifying the speech signal output from the microphone. An A/D converter section 2 is arranged to convert an analog speech signal output from the speech input section 1 into a digital speech signal (digital data) by quantizing the signal by sampling at predetermined clock times.

An analysis section 3 is arranged to extract feature parameters of a speech represented by a speech signal output from the A/D converter section 2, e.g., the power of the speech sound in each of predetermined ranges, linear prediction coefficients (LPC) and cepstrum coefficients by acoustically analyzing the speech signal. That is, the analysis section 3 filters the speech signal output with respect to each of the predetermined ranges by, for example, a filter bank, and rectifies and smooths the result of filtering to obtain the power of the speech sound in each predetermined range, or processes the speech input by, for example, linear predictive coding to obtain linear prediction coefficients and obtains cepstrum coefficients from the linear prediction coefficients.

The feature parameters obtained by the analysis section 3 are output to a recognition section 4 directly or after undergoing vector quantization in the analysis section 3.

The recognition section 4 performs, for example, sentence speech recognition on the basis of the feature parameters supplied from the analysis section 3 (or symbols obtained by vector-quantizing the feature parameters) and in accordance with a speech recognition algorithm of, for example, a dynamic programming (DP) matching method, a hidden Markov model (HMM) or the like by referring to a language model storage section 6 and a dictionary 7 described below. The recognition section 4 thereby obtains a plurality of probable speech recognition results in the form of unit sentences (hereinafter referred to as probable sentences as occasion demands), and outputs these recognition results to an example search section 5.

The example search section 5 is arranged to convert each of a plurality of probable sentences supplied from the recognition section 4 into a word series consisting of independent words alone by, for example, eliminating postpositional words ("joshi" in Japanese grammar) or the like from the sentence. The example search section 5 calculates the degree of similarity between each of the word series of the plurality of probable sentences (hereinafter referred to as input word series as occasion demands) and each of examples of the actual use of language stored in an example data base 8 described below. The example search section 5 selects one of the examples corresponding to the highest degree of similarity. On the basis of the example selected in this manner, a recognition result (sentence) of the speech input to the speech input section 1 is determined.

The calculation of the degree of similarity in the example search section 5 is performed by using a thesaurus stored in a thesaurus storage section 9 and by weighting necessary values on the basis of the context of some example of the actual use of language previously selected, as described below.

The language model storage section 6 has a statistical language model, e.g., a bigram, a trigram or the like stored therein. The recognition section 4 imposes loose linguistic restrictions on the above-mentioned speech recognition processing with the language model stored in the language model storage section 6 and performs the recognition processing by suitably disbranching the processing object by beam searching using, for example, a Viterbi algorithm under such restrictions. The recognition section 4 thereby selects a plurality of probable sentences as probable speech recognition results and outputs the sentences to the example search section 5.

In the dictionary 7 are stored (registered) indexes for words as objects of speech recognition (e.g., an index "invention" with respect to a word "invention") and phoneme (reading) information of the words and, if necessary, information designating parts of speech and the like. Also in the dictionary 7, at least the words constituting examples stored in the example data base 8 described below are stored. The recognition section 4 performs speech recognition with respect to the words stored in the dictionary 7.

A plurality of examples of the actual use of language are stored (registered) in the example data base 8. These examples are made, for instance, on the basis of sentences appearing in newspapers, sentences in scripts read by announcers. The thesaurus storage section 9 stores at least the words registered in the dictionary 7 by sorting them with respect to concepts. In this embodiment, the thesaurus storage section 9 stores a thesaurus in which words are hierarchized in a tree structure on the basis of their concepts, as described below with reference to FIG. 2.

The speech recognition unit 10 is formed of the above-described blocks.

On the other hand, the translation unit 20 has a translation section 11 and an original-translation dictionary 12 having original words and translated words related to each other. The translation section 11 translates the language of the speech recognition result output from the speech recognition unit 10 (example search section 5) into a different language with reference to the original-translation dictionary 12. For example, the translation section 11 has an internal speech synthesizer (not shown) which generates and outputs synthesized sound corresponding to a translation result. The original-translation dictionary 12 has, for example, Japanese words and English words (or series of English words) translated from the Japanese words, which are stored while being related to each other.

For example, data relating to both Japanese words and English words is stored in the language model storage section 6, the dictionary 7, the example data base 8 and the thesaurus storage section 9, thereby enabling the speech recognition unit 10 to recognize speech in each of Japanese and English in the above-described manner. When a speech recognition result in Japanese or English is input to the translation section 11, it is translated into English or Japanese.

In the speech translation apparatus constructed as described above, a speech input to the speech input section 1 undergoes processing in the A/D converter section 2 and the analysis section 3 to be converted into feature parameters (or symbols) which are output to the recognition section 4. In the recognition section 4, speech recognition processing is performed by using the output from the analysis section 3 in accordance with a hidden Markov model (HMM), for example.

A hidden Markov model will be described briefly. A hidden Markov model is defined as a non-deterministic finite state automaton and is constituted of several states and paths representing transitions between the states. Learning for forming such a model is such that a state transition process from each state is a Markov process and that one symbol is output when a transition from each state occurs. If the model has N states and if the number of kinds of symbols output from the model (states) is K, this learning is performed by using a multiplicity of learning data items to obtain the probability $a_{ij}$ of transition from a state i to state j (state transition probability) and the probability $b_{ij}$ (yk) of outputting a symbol yk at the time of this transition (output symbol probability) ($0<i, j<N+1, 0<k<K+1$).

HMM parameters include the probability $\pi i$ of being initially in the state i. However, a left-to-right model in which the state has only a transition to itself or to a point on the right-hand side is ordinarily used for speech recognition, and the initial state is set as the leftmost state in such a model (the probability of initially being in the leftmost state is set to 1 while the probability of initially being in one of the other states is set to 0). Ordinarily, therefore, there is no need for obtaining the initial state probability in learning.

On the other hand, at the time of recognition, the probability with which symbol series output from the analysis section 3 are observed (occur) (the probability of occurrence) is calculated by using the state transition probabilities and output symbol probabilities obtained by learning. Those with high probabilities are obtained as probable recognition results (or simply as recognition results).

In this embodiment, models of units corresponding to phonemes (phoneme models) previously obtained by learning, for example, are stored in the recognition section 4. The recognition section 4 connects phoneme models to form models of the words registered in the dictionary 7 by referring to word phoneme information registered in the dictionary 7. The recognition section 4 calculates the probability of occurrence by using these models as described above and obtains words having high probabilities.

Alternatively, in the recognition section 4, models of units corresponding to words may be stored and continuous speech recognition may be made by directly using such models.

Further, the recognition section 4 performs the above-described processing by imposing loose linguistic restrictions with a bigram or a trigram stored in the language model storage section 6 and by suitably disbranching symbol series by beam searching using, for example, a Viterbi algorithm under the restrictions. In this case, the search space in the recognition section 4 before obtaining probable sentences is reduced, so that the amount of calculation in the speech recognition processing of the speech recognition unit 10 and, hence, the speed of processing can be reduced.

Since the restrictions imposed with the language model in the recognition section 4 are loose, it is possible that probable sentences obtained by the recognition section 4 include some erroneous sentences as well as those correct in terms of meaning. However, the probability with which one of such erroneous sentences becomes a final speech recognition result is very low because the degree of likelihood of such sentences calculated in the subsequent example search section 5 is low.

A bigram or trigram is, for example, a model of a first- or second-order Markov process obtained by learning the probability of chaining of phonemes, syllables and words on the basis of a large-amount text data base and is known as a model capable of precisely approximating local characteristics of a natural language.

Alternatively, linguistic restrictions may be imposed by using, for example, a finite state network instead of a language model.

Under such linguistic restrictions, a plurality of probable sentences obtained are output to the example search section 5 to be converted into word series, as mentioned above. In the example search section 5, the degree of similarity between each of the plurality of word series (input word series) and each of the examples of the actual use of language stored in the example data base 8 is calculated and one of the examples corresponding to the highest degree of similarity is selected.

In this embodiment, the degree of similarity is calculated using a thesaurus, such as the one disclosed in the above-mentioned Japanese Patent Laid-Open Publication No. 276367/1991, in which words are hierarchized as elements of a tree structure on the basis of the similarity of their meanings (concepts). That is, if a concept class in which a word constituting an input word series and a word constituting an example of the actual use of language and corresponding to the input word are thought to belong to one category is the kth class, the degree of word similarity representing a conceptual similarity between these words is set as $(k-1)/n$ (n: the number of classes in the thesaurus) and the degree of word similarity is integrated with respect to the words constituting the input word series and the words constituting the example. The result of this integration is set as the degree of similarity between the input word series and the example.

Figure 2:
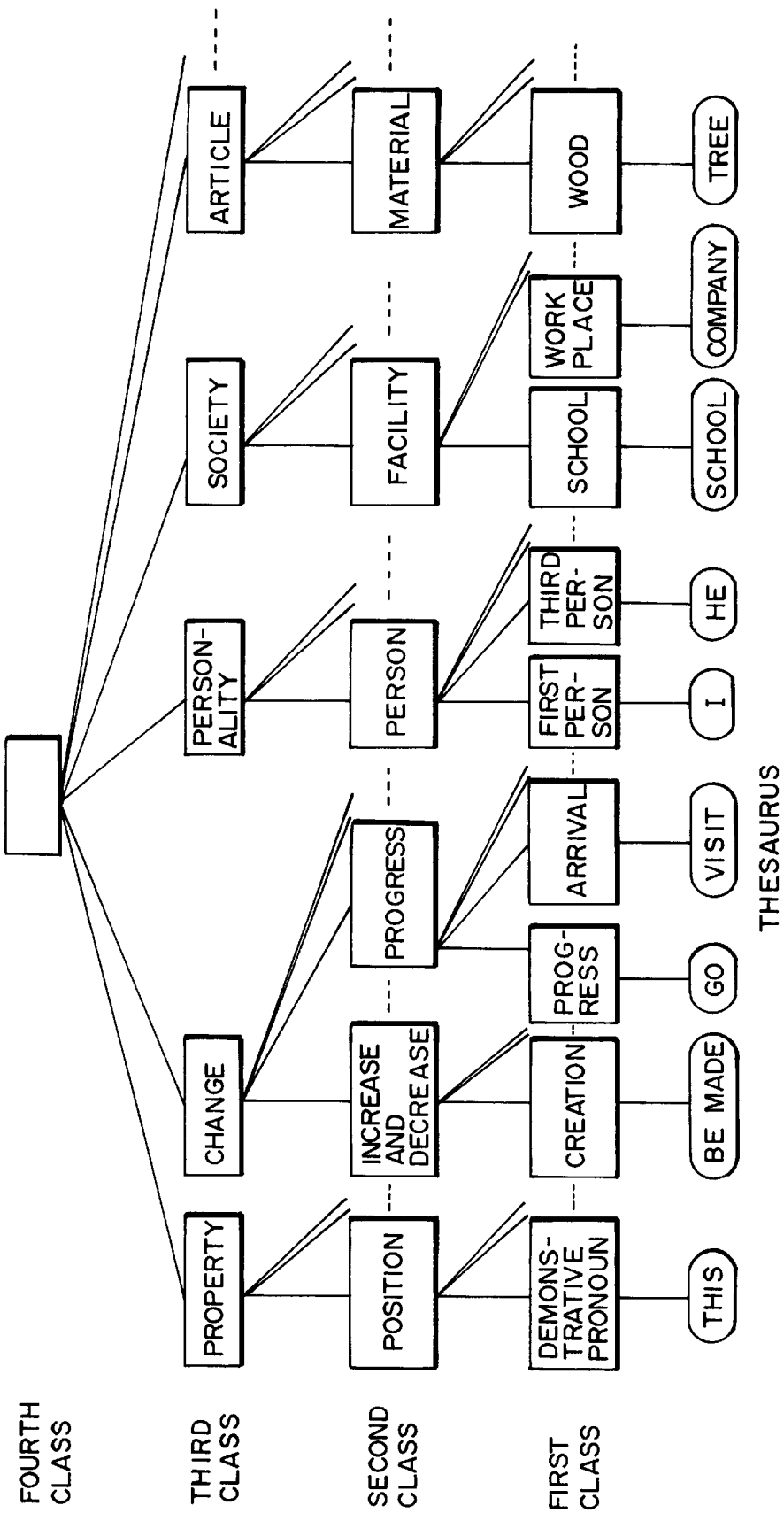
FIG. 2 is a diagram of a thesaurus.

More specifically, if a thesaurus such as that shown in FIG. 2 is stored in the thesaurus storage section 9, the degree of similarity is calculated as described below.

In FIG. 2, terms in rectangular figures represent concepts while terms in elliptical figures represent thesaurus words. In the thesaurus shown in FIG. 2, a concept belonging to the uppermost class (the fourth class) is divided into concepts "property", "change", "personality", "society", "article" and so on. Of these concepts, the concept "change", for example, is divided into concepts "increase or decrease", "progress" and so on. Further, the concepts "progress" is divided into concepts included therein, i.e., "progress", "arrival" and so on. For example, to the concept "arrival", a word "Houmon-suru (visit)" and the like in the corresponding category belong.

In the thesaurus shown in FIG. 2, the lowermost concept class is set as a first class, and the second concept class from the bottom is set as a second class. Similarly, the third concept class from the bottom and the uppermost concept class are set as third and fourth classes, respectively. Since the thesaurus shown in FIG. 2 is formed of four classes (of concepts), the degree of word similarity between words which become equal to each other in concept by stepping upward to the first class in the thesaurus is 0 (=$(1-1)/4$) and the degree of word similarity between words which become equal to each other in concept by stepping upward to the second class in the thesaurus is $1/4$ (=$(2-1)/4$). Also, the degree of word similarity between words which become equal to each other in concept by stepping upward to the third or fourth class in the thesaurus is $1/2$ or $3/4$.

For example, a probable sentence "Watashi wa Gakkou e Iku (I go to school)" is output from the recognition section 4 to the example search section 5 and is changed into input word series ("Watashi" (I), "Gakkou" (school), "Iku" (go)) by being separated at postpositional words, as mentioned above. In this case, the degree of word similarity between this input word series ("Watashi" (I), "Gakkou" (school), "Iku" (go)) and an example "Kare wa Kaisha wo Houmon-suru (He visits a company)", for instance, is calculated as described below.

That is, the degree of word similarity between each of the words "Watashi" (I), "Gakkou" (school) and "Iku" (go) constituting the input ward series ("Watashi" (I), "Gakkou" (school), "Iku" (go)) and the corresponding one of the words "Kare (he)", "kaisha (company)" and "Houmon-suru (visit) constituting the example "Kare wa Kaisha wo Houmon-suru (He visits a company)" and corresponding to "Watashi" (I), "Gakkou" (school) and "Iku" (go) is first calculated.

It is assumed here that the degree of word similarity between words X and Y is $d(X, Y)$. The words "Watashi (I)" and "Kare (he)" become equal to each other in the concept "person" by stepping upward to the second class. Then the degree of word similarity $d$ ("Watashi (I)", "Kare (he)") is $1/4$. The degree of word similarity $d$ ("Gakkou (school)", "Kaisha (company)") is also $1/4$ since the words "Gakkou (school)" and "Kaisha (company)" become equal to each other in the concept "facility" by stepping upward to the second class. Further, the degree of word similarity $d$ ("Iku (go)", "Houmon-suru (visit)") is also $1/4$ since the words "Iku (go)" and "Houmon-suru (visit)" become equal to each other in the concept "progress" by stepping upward to the second class.

These degrees of word similarities are added up to obtain an added value of $3/4$ (=$1/4+1/4+1/4$) as the degree of similarity between the input word series ("Watashi" (I), "Gakkou" (school), "Iku" (go)) and the example "Kare wa Kaisha wo Houmon-suru (He visits a company)".

The degree of similarity between the input word series ("Watashi" (I), "Gakkou" (school), "Iku" (go)) and an example "Kore wa Ki de Dekiteiru (this is made of wood)" is calculated as described below.

That is, the degrees of word similarity $d$ ("Watashi (I)", "Kore (this)"), $d$ ("Gakkou (school)", "Ki (wood)") and $d$ ("Iku (go)", "Dekiru (be mode)") between the words "Watashi" (I), "Gakkou" (school) and "Iku" (go) constituting the input ward series ("Watashi" (I), "Gakkou" (school), "Iku" (go)) and the words "Kore (this)", "Ki (wood)" and "Dekiru (be made)" (substituted for "Dekiteiru (be made)") constituting the example "Kore wa Ki de Dekiteiru (this is made of wood)" and corresponding to "Watashi" (I), "Gakkou" (school) and "Iku" (go) are calculated in the above-described manner to be determined as $3/4$, $3/4$, and $2/4$, respectively. From these values, the degree of similarity between the input word series ("Watashi" (I), "Gakkou" (school), "Iku" (go)) and the example "Kore wa Ki de Dekiteiru (this is made of wood)" is obtained as $8/4$ ($3/4+3/4+2/4$).

Thus, the degree of similarity between each of all the examples stored in the example data base and each of a plurality of probable sentences (input word series) is calculated.

Thereafter, in the example search section 5, the pair of the example and the input word series having the highest degree of similarity is selected. (The selected example of input word series will hereinafter be referred to as "selected example" or "selected word series").

Then, in the example search section 5, a sentence is formed by substituting the words constituting the selected word series respectively for the words constituting the selected example and corresponding to the words constituting the selected word series. This sentence is output as a sentence speech recognition result.

That is, this operation will be described briefly with respect to a simple situation where "Kare wa Kaisha wo Houmon-suru (he visits a company)" and "Kore wa Ki de Dekiteiru (This is made of wood)" are stored as examples of the actual use of language in the example data base 8, and where ("Watashi" (I), "Gakkou" (school), "Iku" (go)) is obtained as an input word series. In this situation, the degree of similarity between the input word series ("Watashi" (I), "Gakkou" (school), "Iku" (go)) and the example "Kare wa Kaisha wo Houmon-suru (He visits a company)" or "Kore wa Ki de Dekiteiru (This is made of wood)" is ¾ or ⅜, as described above. In this embodiment, a smaller value obtained as the degree of similarity signifies a higher degree of similarity. (This is because the concept classes forming the thesaurus shown in FIG. 2 are set so that the order of the first class, the second class . . . starts from the lowermost class. Conversely, if the concept classes forming the thesaurus are set so that the order of the first class, the second class . . . starts from the uppermost class, a larger value obtained as the degree of similarity corresponds to a higher degree of similarity.) Accordingly, in the example search section 5, the input word series ("Watashi" (I), "Gakkou" (school), "Iku" (go)) and the example "Kare wa Kaisha wo Houmon-suru (he visits a company)" are selected.

Also, in the example search section 5, the words constituting the selected example "Kare wa Kaisha wo Houmon-suru (he visits a company)" and corresponding to the words constituting the selected word series ("Watashi" (I), "Gakkou" (school), "Iku" (go)), i.e., "Kare (he)", "kaisha (company)" and "Houmon-suru (visit) corresponding to words "Watashi" (I), "Gakkou" (school) and "Iku" (go) constituting the selected word series, are replaced with the words "Watashi" (I), "Gakkou" (school) and "Iku" (go), respectively. Further, the postpositional words are changed if necessary. As a result, "Watashi wa Gakkou e Iku (I go to school)" is obtained and output as a sentence speech recognition result.

This sentence speech recognition result is supplied to the translation section 11. In the translation section 11, the sentence speech recognition result "Watashi wa Gakkou e Iku (I go to school)" from the example search section 5 is translated into, for example, an English sentence "I go to school" by referring to the original-translation dictionary 12. Also, a synthesized sound corresponding to this English version "I go to school" is generated and output.

The case where speech is input in Japanese has been described. However, if speech "I go to school", for example, is input in English, speech recognition and translation are performed in the same manner in the speech recognition unit 10 and the translation unit 20. A result "Watashi wa Gakkou e Iku (I go to school)" thereby obtained is output as synthesized sound.

The example search section 5 is also arranged for weighting in the above-described calculation of the degree of similarity on the basis of the context of some example previously selected. That is, prediction information is stored in the example data base 8 along with the above-described examples of the actual use of language. For example, the prediction information is used to predict, from the example presently selected, some of the examples each of which is likely to be used for the next speech recognition processing. In the example search section 5, the degree of similarity is weighted on the basis of the prediction information.

More specifically, in the example data base 8, information which relates one example used for speech recognition processing to some other examples likely to be used for the next speech recognition processing (selected in the next speech recognition processing) is stored as prediction information. In the example search section 5, the degree of similarity is weighted so that the degree of similarity of the examples related to the example used in the preceding speech recognition processing is higher or the degree of similarity of the examples not related to the example used in the preceding speech recognition processing is lower.

In the example data base 8, a table such as that shown in FIG. 3 is stored, in which one example used for speech recognition processing is related to some other examples likely to be used for the next speech recognition processing. According to this table, with respect to one example and another example read along the direction from a left table cell to a right table cell, the contextual relationship between the two examples can appear in utterance or dialogue between persons. The direction from a left cell to a right cell of the table of FIG. 3 can therefore be said to represent the flow or utterance or dialogue. Each of combinations of examples shown in the left and right table cells, which expresses the flow of utterance or dialogue, will hereinafter be referred to as a "script" as occasion demands.

For example, referring to FIG. 3, "Okyaku-sama no Oname wo Douzo (May I have your name, please?)", "Goyoyaku wa Sarete-imaska (Is your reservation made?)" and "Kono Youshi ni Gokinyuu wo Onegai-shimasu (Please fill in this form.)" are registered as examples fairly likely to be used subsequently to an example "Chekku-in wo Onegai-shimasu (I'd like to check in, please)". Also, "Gozai-masu (Yes, we do.)", "Gozai-masen (No, we don't.)" and "Manshitu-desu (We are fully booked.)" are registered as examples fairly likely to be used subsequently to an example "Heya wa Ari-masuka (Do you have a room available ?)".

A case will be described in which, if the table of FIG. 3 is registered in the example data base 8, a user of the speech translation apparatus utters "Chekku-in wo Onegai-shimasu (I'd like to check in, please.)" in Japanese at the front desk of a hotel in the United States of America, and in which the input speech "Chekku-in wo Onegai-shimasu (I'd like to check in, please.)" is recognized in the speech recognition unit 10 by using the example "Chekku-in wo Onegai-shimasu (I'd like to check in, please.)". In this case, "Chekku-in wo Onegai-shimasu (I'd like to check in, please.)" is output as a speech recognition result from the speech recognition unit 10. This output is translated into English in the translation section 11 to output, for instance, "I'd like to check in, please." in the form of synthesized sound.

A front desk clerk who hears this synthesized sound utters, for example, "May I have your name, please" in English. With respect to speech input to the speech recognition unit 10, one of the examples corresponding to the highest degree of similarity is selected and obtained as a speech recognition result in the speech recognition unit 10, as described above. In this case, the degree of similarity is weighted by referring to the script so that the degrees of similarity of the examples ("Okyaku-sama no Onamae wo Douzo (May I have your name, please?)", "Goyoyaku wa Sarete-imasuka (Is your reservation made?)" and "Kono Youshi ni Gokinyuu wo Onegai-shimasu (Please fill in this form.)" in the example of prediction information shown in FIG. 3) related to the example "Chekku-in wo Onegai-shimasu (I'd like to check in, please.)" used for the preceding speech recognition processing become higher.

Figure 4:
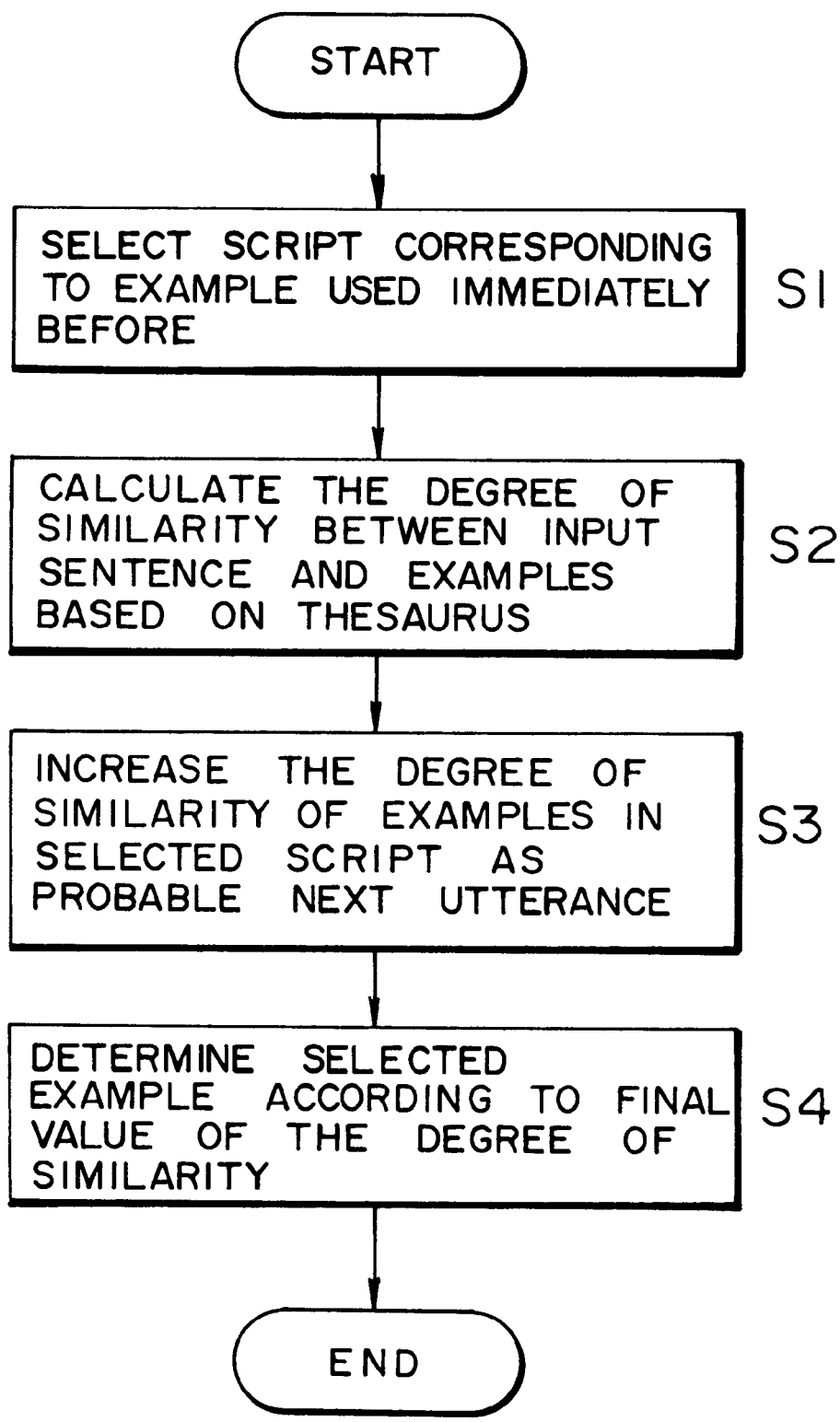
FIG. 4 is a flowchart of the operation of example search section 5.

That is, in this case, the operation of the example search section 5 of the speech recognition unit 10 is as shown in the flowchart of FIG. 4. First, in step S1, the examples (script) "Okyaku-sama no Onamae wo Douzo (May I have your name, please?)", "Goyoyaku wa Sarete-imasuka (Is your reservation made?)" and "Kono Youshi ni Gokinyuu wo Onegai-shimasu (Please fill in this form.)" related to the example "Chekku-in wo Onegai-shimasu (I'd like to check in, please.)" used in the preceding speech recognition processing are selected. In step S2, the degree of similarity between the plurality of probable sentences output from the recognition section 4 and the plurality of examples stored in the example data base 8 is calculated by using the thesaurus, as described above.

The process advances to step S3 to increase the degrees of similarity corresponding to the examples (script) selected in step S1 and then advances to step S4 to select the example and the probable sentence having the highest degree of similarity, followed by the above-described processing for obtaining a final speech recognition result.

Therefore, even if the degree of similarity of the example "Chekku-in wo Onegai-shimasu (I'd like to check in, please.)" is not highest in step S2, it is increased by the processing in step S3. As a result, the degree of similarity of the example "Chekku-in wo Onegai-shimasu (I'd like to check in, please.)" can become highest.

As described above, the degree of similarity is obtained by considering the flow of dialogue (or utterance) on the basis of the context of the example used previously as well as the similarity of the meanings of words on the thesaurus. Thus, the present invention makes it possible to obtain examples more suitable for speech recognition processing in comparison with the conventional art, thus improving the accuracy of speech recognition, i.e., the speech recognition rate.

Actually, the examples shown in the right cells in FIG. 3 are expressed in English since they are anticipated examples of utterance of the hotel front desk clerk in the above-mentioned situation. (For example, "Okyaku-sama no Onamae wo Douzo (May I have your name, please?)" is expressed as "May I have your name, please?").

In the above-described case, the degree of similarity is weighted so that the degree of similarity of the examples related to the example used in the preceding speech recognition processing is higher. Alternatively, the degree of similarity may be weighted so that the degree of similarity of the examples not related to the example used in the preceding speech recognition processing is lower.

Further, while in the above-described case the degree of similarity is weighted so that the degree of similarity of the examples related to the example used in the preceding speech recognition processing is higher. Also, the degree of similarity may be weighted on the basis of other previously-used examples as well as the one used immediately before. For example, if the guest has already given his or her name and if the example for recognition of such a speech, weighting may be such that the degree of similarity of examples for recognition of speech uttered to ask a guest's name (e.g., "Okyaku-sama no Oname wo Douzo (May I have your name, please?)" shown in FIG. 3) is reduced.

The arrangement may also be such that in the example data base 8 the contents of the table (scripts) of FIG. 3 are stored as examples used with respect to predetermined places, e.g., a hotel, a restaurant, an airport and so on while the example search section 5 is arranged to perform processing by using the table (scripts) according to the place where the speech translation apparatus of FIG. 1 is used. In such a case, the number of scripts used for speech recognition processing is limited, so that the speech recognition performance can be improved and the amount of calculation can be reduced. An operating unit (not shown) may be operated to enable the speech translation apparatus to recognize the kind of place where the apparatus is used. It is also possible to make the apparatus to recognize the kind of place where the apparatus is used from the content of utterance. For example, if speech "Heya wa Ari-masuka (Do you have a room available?)" or the like is input, a table reflecting the flow of utterance or dialogue at a hotel is used. If speech "Show me the menu." or the like is input, a table reflecting the flow of utterance or dialogue in a restaurant is used. The example search section 5 performs processing using such a table.

Further, examples likely to be used in the next processing may be obtained by learning and stored in the example data base 8. In such a case, a large amount of learning data may be used at the time of learning to obtain the probability of use of each example, and weighting for changing the degree of similarity may be controlled according to the probability, thereby enabling selection of examples more suitable for speech recognition processing.

The method of translation in the translation section 11 has not particularly be mentioned. However, translation in the translation section 11 may be performed by a translation method disclosed in the above-mentioned Japanese Patent Laid-Open No. 276367/1991. In this case, the example data base 8 can be used in common for the example search section 5 and the translation section 11. Further, in the translation section, weighting in the process of calculating the degree of similarity can be performed on the basis of the context of examples previously selected the translation section 11, as is the weighting in the example search section 5. If this weighting is done, the accuracy of translation can be improved. The method of translation in the translation section 11 is not limited to the method disclosed in Japanese Patent Laid-Open No. 276367/1991.

Figure 5:
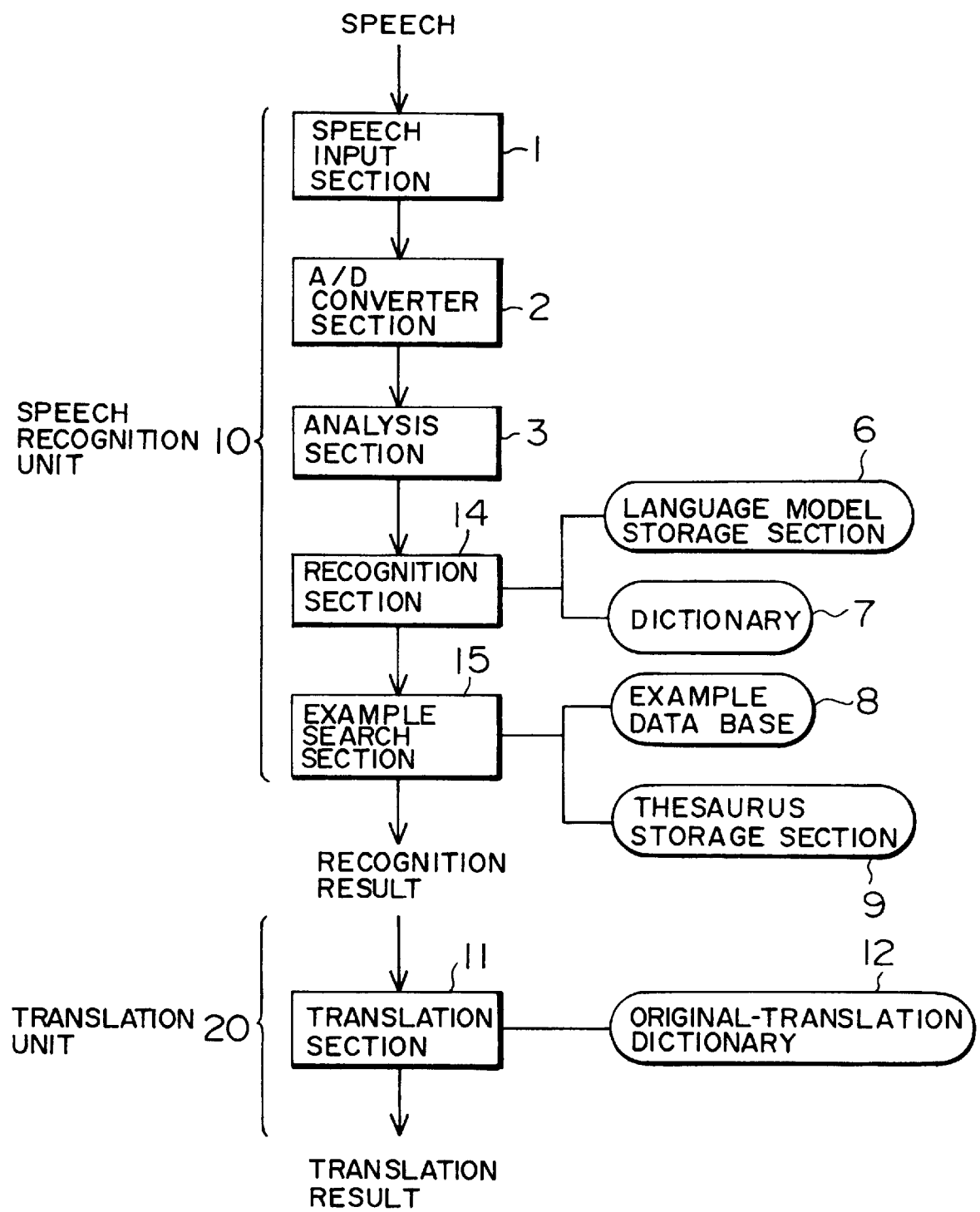
FIG. 5 is a block diagram showing the construction of a second embodiment of a speech translation apparatus to which the present invention is applied.

FIG. 5 shows another embodiment of the speech translation apparatus to which the present invention is applied. In FIG. 5, the sections corresponding to those shown in FIG. 1 are indicated by the same reference characters. That is, this speech translation apparatus is arranged in the same manner as the speech translation apparatus of FIG. 1 except that a recognition section 14 and an example search section 15 are provided in place of the recognition section 4 and the example search section 5, respectively.

The recognition section 14 is arranged to perform speech recognition, for example, in the same manner as the recognition section 4 of FIG. 4 and to output a plurality of probable sentences to the example search section 15. The recognition section 14 is also arranged to output, along with a plurality of probable sentences, the likelihood of each of the probable sentences (and the above-mentioned probability of occurrence if, for example, a hidden Markov model).

The example search section 15 is arranged to convert each of a plurality of probable sentences supplied from the recognition section 14 into an input word series and to calculate the degree of similarity between the input word series and each of examples stored in the example data base 8 to select the example corresponding to the highest degree of similarity, as is the example search section 5 of FIG. 1. The example search section 15 is also arranged to determine a result (sentence) of recognition of the speech input to the speech input section 1. Also, the calculation of the degree of similarity in the example search section 15 is performed by considering the likelihood of each of the plurality of probable sentences supplied from the recognition section 14.

When a speech is input to the speech translation apparatus thus arranged, the same processing as that in the speech translation apparatus of FIG. 1 is performed in the speech input section 1, the A/D converter section 2, the analysis section 3 and the recognition section 14. A plurality of probable sentences are thereby output from the recognition section 14 to the example search section 15. The likelihood of each of the plurality of probable sentences is also output from the recognition section 14 to the example search section 15.

Figure 6:
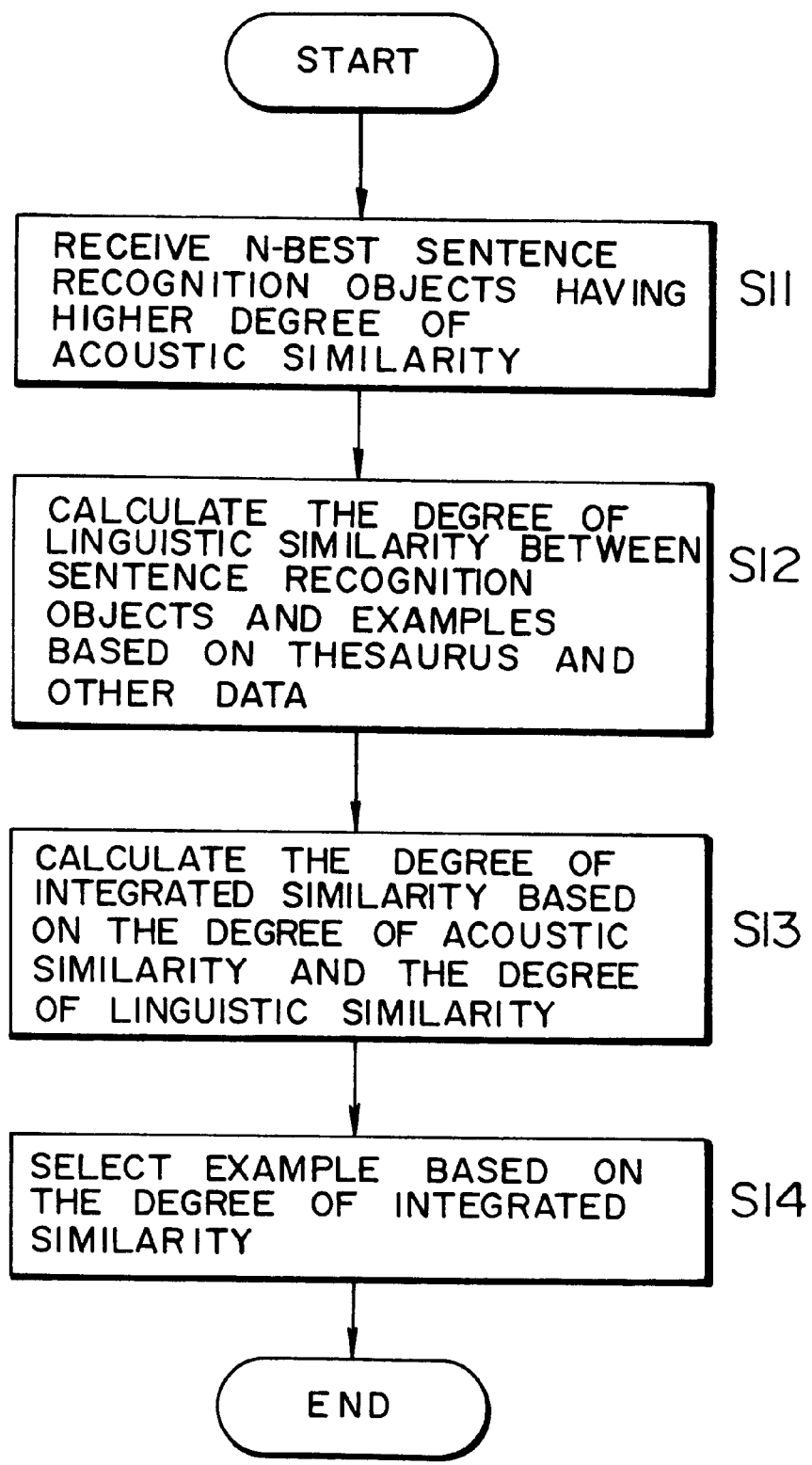
FIG. 6 is a flowchart of the operation of example search section 15.

The operation of the example search section 15 is as shown in the flowchart of FIG. 6. First, in step S11, the plurality of probable sentences (speech recognition objects) and the likelihood of each probable sentence from the recognition section 14 are received and converted into input word series. In step S12, the degree of similarity between each of the plurality of probable sentences and each of the examples stored in the example data base 8 is calculated by using a thesaurus and scripts selected according to one's need. (It is not necessary to use scripts but the accuracy of the degree of similarity can be improved if scripts are used.)

The degree of similarity obtained in step S12 represents the correctness in terms of grammatical use and meaning, that is, linguistic correctness. This correctness will hereinafter be referred to as the degree of lingustic similarity. On the other hand, the likelihood output from the recognition section 14 represents the correctness of each of the plurality of probable sentences obtained as a result of acoustic processing. This correctness will hereinafter be referred to as the degree of acoustic similarity.

In step S13, the degree of integrated similarity of each of the plurality of probable recognition results and each of the plurality of examples stored in the example data base 8 is calculated on the basis of the degree of linguistic similarity and the degree of acoustic similarity.

For example, the degree of integrated similarity is calculated by a polynomial expressed by using the degree of linguistic similarity and the degree of acoustic similarity. That is, the degree of integrated similarity is calculated by adding the degree of linguistic similarity and the degree of acoustic similarity in a predetermined ratio. More specifically, if the degree of integrated similarity, the degree of linguistic similarity and the degree of acoustic similarity are Sg, Sl and Ss, respectively, the degree of integrated similarity Sg is calculated by the following equation:

$$Sg = \alpha Sl + (1-\alpha) Ss \qquad (1)$$

where $\alpha$ is a real number satisfying $0 < \alpha < 1$.

After calculating the degree of integrated similarity by equation (1), the process advances to step S14 to select the example and the probable sentence having the highest degree of integrated similarity. Subsequently, the same processing as that in the apparatus shown in FIG. 1 is performed to obtain a translation result.

The calculation of the degree of integrated similarity by equation (1) may be performed only with respect to the example corresponding to each of the plurality of probable sentences with the highest degree of linguistic similarity. Preferably, the calculation of the degree of integrated similarity is performed after normalizing the degree of linguistic similarity and the degree of acoustic similarity.

As described above, when an example used for obtaining a final speech recognition result is selected, the acoustic similarity (likelihood) obtained in the recognition section 4 is taken into consideration as well as the linguistic similarity. As a result, the speech recognition rate can be improved.

That is, conversely speaking, a final speech recognition result is obtained by using not only the acoustic similarity but also the linguistic similarity, so that, even if the degree of acoustic similarity of the proper one of the probable sentences is reduced by some cause (e.g., noise or the like), the degree of integrated similarity of the proper sentence can be sufficiently increased by taking the linguistic similarity into consideration. Thus, the proper sentence can be prevented from recognized as an improper one.

The value $\alpha$ in equation (1) that determines the ratio in which the degree of linguistic similarity and the degree of acoustic similarity are added to each other can be dynamically changed. That is, if the level of noise in an environment in which the speech translation apparatus is used is high, it is possible that the reliability of the degree of acoustic similarity is considerably low. In such a situation, the value $\alpha$ is increased to reduce the percentage of contribution of the degree of acoustic similarity of the degree of integrated similarity while increasing the percentage of contribution of the degree of linguistic similarity. If the noise level is low, the value $\alpha$ is reset to the ordinary value. In this manner, the reliability of the apparatus under environmental changes can be improved.

As described above, when the degree of similarity (integrated similarity) is calculated, the context of examples previously used and the degree of acoustic similarity are taken into consideration as well as the degree of similarity according to the thesaurus, thereby improving the accuracy of selection of examples and, hence, the accuracy of speech processing (natural language processing).

The invention has been described with respect to the case of application to a speech translation apparatus. The present invention, however, can also be applied to any other apparatuses requiring natural language processing, e.g., a speech recognition apparatus or a machine translation apparatus.

In the above-described embodiments, Japanese sentences translated into English sentences. However, it is also possible to translate languages other than Japanese and to translate a language into another language other than English.

In the above-described embodiments, probable sentences are obtained under the restriction using a language model in the recognition section (also in the recognition section 14) and each of the probable sentence is separated into a series of words in the example search section 5 (also in the example search section 15. Alternatively, the arrangement may be such that, for example, continuous speech recognition is performed in the recognition section 4 without being restricted by a language model, and words thereby obtained are combined to form a word series in the example search section 5.

In the above-described embodiments, postpositional words are not included in input word series. Alternatively, the example search section 5 may be arranged to process input word series containing postpositional words.

Further, while a translation result is output in the form of synthesized sound in the above-described embodiments, it may also be displayed as image information.

In the apparatus and the method for processing a natural language in accordance with the present invention, when the degree of similarity between each of examples stored in the example storage means and an input sentence is calculated to select one of the examples corresponding to the highest degree of similarity, the degree of similarity is calculated by being weighted according to the context of at least one example previously selected. The accuracy of the degree of similarity is thereby improved, so that an example more suitable for processing can be selected.

In another aspect, in the apparatus and the method for processing a natural language in accordance with the present invention, a plurality of probable recognition results and the likelihood of each probable recognition result are obtained and the degree of linguistic similarity between each of the probable recognition results and each of examples stored in the example storage means is calculated. Further, the degree of integrated similarity between each of the plurality of probable recognition results and each of the examples stored in the example storage means is calculated by combining the degree of linguistic similarity and the likelihood. One of the examples corresponding to the highest degree of integrated similarity is selected and a speech recognition result is obtained on the basis of the selected example. Consequently, the speech recognition rate can be improved.

What is claimed is:

1. An apparatus for processing a natural language in which an input sentence is processed by using an example of an actual use of a language most similar to the input sentence, said apparatus comprising:

input means for inputting an input sentence;

conversion means for converting said input sentence into input sentence data;

example storage means for storing a plurality of examples of actual uses of a language; and selection means for calculating a degree of similarity between the input sentence data and each of the examples stored in said example storage means and for selecting an example corresponding to a highest degree of similarity, wherein said selection means is further configured to calculate the degree of similarity by weighting some of the examples, said weighting being performed based on a context according to at least one of the examples previously selected, and wherein at least one of said plurality of examples comprises more than one word.

2. An apparatus according to claim 1, wherein said example storage means is further configured to store prediction information for predicting some of the examples likely to be used for a next processing, and wherein said selection means is further configured to perform said weighting based on the prediction information.

3. An apparatus according to claim 2, wherein said example storage means is further configured to store as the prediction information a group of information in which the example presently used for processing is related to some of the examples likely to be used for the next processing, and wherein said selection means is further configured to perform weighting so that the degree of similarity of some of the examples related the example used in a preceding processing increases or the degree of similarity of some of the examples not related the example used in a preceding processing decreases.

4. An apparatus according to claim 2, wherein said example storage means is further configured to store a group of information in which some of the examples likely to be used for the next processing are related to one of the examples presently used, the group of information being obtained by learning.

5. An apparatus according to claim 2, wherein said example storage means is further configured to store the prediction information by sorting the examples in the prediction information into groups of examples used in correspondence with predetermined places, and wherein said selection means is further configured to use the prediction information according to each of the predetermined places.

6. A method of processing a natural language using a natural language processing apparatus which has example storage means having a plurality of examples of an actual use of a language stored therein, and which processes an input sentence by using one of the examples most similar to the input sentence, said method comprising the steps of:

inputting an input sentence;

converting said input sentence into input sentence data;

calculating a degree of similarity between the input sentence data and each of the examples stored in said example storage means; and selecting an example corresponding to the highest degree of similarity, wherein in said calculation step the degree of similarity is calculated by performing weighting based on a context according to at least one of the examples previously selected, and wherein at least one of said plurality of examples comprises more than one word.

7. A speech recognition apparatus for performing sentence speech recognition, said apparatus comprising:

extraction means for extracting at least one feature parameter of a speech in a language by acoustically analyzing the speech;

probable recognition result calculation means for obtaining a plurality of probable recognition results and a likelihood of each of the probable recognition results by recognizing the speech based on the feature parameter output from said extraction means;

example storage means for storing a plurality of examples of an actual use of the language;

linguistic similarity calculation means for calculating a degree of linguistic similarity between each of the plurality of probable recognition results and each of the examples stored in the example storage means;

integrated similarity calculation means for calculating a degree of integrated similarity between each of the plurality of probable recognition results and each of the examples stored in the example storage means based on the degree of linguistic similarity and the likelihood;

selection means for selecting one of the examples corresponding to a highest degree of integrated similarity; and recognition result calculation means for obtaining a result of recognition of the speech based on the example selected by said selection means.

8. An apparatus according to claim 7, wherein said integrated similarity calculation means calculates the degree of integrated similarity by adding the degree of linguistic similarity and the likelihood in a predetermined ratio.

9. An apparatus according to claim 8, wherein said integrated similarity calculation means dynamically changes the ratio in which the degree of linguistic similarity and the likelihood are added.

10. A speech recognition method using a speech recognition apparatus which has example storage means for storing a plurality of examples of an actual use of a language and which performs sentence speech recognition, said method comprising the steps of:

extracting at least one feature parameter of a speech by acoustically analyzing the speech;

obtaining a plurality of probable recognition results and a likelihood of each of the probable recognition results by recognizing the speech based on the feature parameter;

calculating a degree of linguistic similarity between each of the plurality of probable recognition results and each of the examples stored in the example storage means;

calculating a degree of integrated similarity between each of the plurality of probable recognition results and each of the examples stored in the example storage means based on the degree of linguistic similarity and the likelihood; and selecting one of the examples corresponding to a highest degree of integrated similarity and obtaining a result of recognition of the speech based on the example selected.

11. An apparatus for processing a natural language in which an input sentence is processed by using an example of an actual use of a language most similar to the input sentence, said apparatus comprising:

example storage means for storing a plurality of examples of actual uses of a language;

selection means for calculating a degree of similarity between the input sentence and each of the examples stored in said example storage means and for selecting an example corresponding to a highest degree of similarity; and output means for generating an output sound corresponding to the selected example, wherein said selection means is further configured to calculate the degree of similarity by weighting some of the examples, said weighting being performed based on a context according to at least one of the examples previously selected, and wherein at least one of said plurality of examples comprises more than one word.

12. An apparatus according to claim 11, wherein said example storage means is further configured to store prediction information for predicting some of the examples likely to be used for a next processing, and wherein said selection means is further configured to perform said weighting based on the prediction information.

13. An apparatus according to claim 12, wherein said example storage means is further configured to store as the prediction information a group of information in which the example presently used for processing is related to some of the examples likely to be used for the next processing, and wherein said selection means is further configured to perform weighting so that the degree of similarity of some of the examples related the example used in a preceding processing increases or the degree of similarity of some of the examples not related the example used in a preceding processing decreases.

14. An apparatus according to claim 12, wherein said example storage means is further configured to store a group of information in which some of the examples likely to be used for the next processing are related to one of the examples presently used, the group of information being obtained by learning.

15. An apparatus according to claim 12, wherein said example storage means is further configured to store the prediction information by sorting the examples in the prediction information into groups of examples used in correspondence with predetermined places, and wherein said selection means is further configured to use the prediction information according to each of the predetermined places.

16. A method of processing a natural language using a natural language processing apparatus which has example storage means having a plurality of examples of an actual use of a language stored therein, and which processes an input sentence by using one of the examples most similar to the input sentence, said method comprising the steps of:

calculating a degree of similarity between the input sentence and each of the examples stored in said example storage means; and selecting an example corresponding to the highest degree of similarity; and generating an output sound corresponding to the selected example, wherein in said calculation step the degree of similarity is calculated by performing weighting based on a context according to at least one of the examples previously selected, and wherein at least one of said plurality of examples comprises more than one word.

17. An apparatus for processing a natural language in which an input sentence is processed by using an example of an actual use of a language most similar to the input sentence, said apparatus comprising:

a microphone configured to input an input sentence;

an A/D converter section configured to convert said input sentence into input sentence data;

an example data base configured to store a plurality of examples of actual uses of a language; and an example search section configured to calculate a degree of similarity between the input sentence data and each of the examples stored in said example data base and to select an example corresponding to a highest degree of similarity, wherein said example search section is further configured to calculate the degree of similarity by weighting some of the examples, said weighting being performed based on a context according to at least one of the examples previously selected, and wherein at least one of said plurality of examples comprises more than one word.

18. An apparatus according to claim 17, wherein said example data base is further configured to store prediction information for predicting some of the examples likely to be used for a next processing, and wherein said example search section is further configured to perform said weighting based on the prediction information.

19. An apparatus according to claim 18, wherein said example data base is further configured to store as the prediction information a group of information in which the example presently used for processing is related to some of the examples likely to be used for the next processing, and wherein said example search section is further configured to perform weighting so that the degree of similarity of some of the examples related the example used in a preceding processing increases or the degree of similarity of some of the examples not related the example used in a preceding processing decreases.

20. An apparatus according to claim 18, wherein said example data base is further configured to store a group of information in which some of the examples likely to be used for the next processing are related to one of the examples presently used, the group of information being obtained by learning.

21. An apparatus according to claim 18, wherein said example data base is further configured to store the prediction information by sorting the examples in the prediction information into groups of examples used in correspondence with predetermined places, and wherein said example search section is further configured to use the prediction information according to each of the predetermined places.

22. A speech recognition apparatus for performing sentence speech recognition, said apparatus comprising:

an analysis section configured to extract at least one feature parameter of a speech in a language by acoustically analyzing the speech;

a recognition section configured to obtain a plurality of probable recognition results and a likelihood of each of the probable recognition results by recognizing the speech based on the feature parameter output from said analysis section;

an example data base configured to store a plurality of examples of an actual use of the language; and an example search section configured to calculate a degree of linguistic similarity between each of the plurality of probable recognition results and each of the examples stored in the example data base, said example search section being further configured to calculate a degree of integrated similarity between each of the plurality of probable recognition results and each of the examples stored in the example data base based on the degree of linguistic similarity and the likelihood, said example search section being further configured to select one of the examples corresponding to a highest degree of integrated similarity, and said example search section being further configured to obtain a result of recognition of the speech based on the example selected corresponding to the highest degree of integrated similarity.

23. An apparatus according to claim 22, wherein said example search section is further configured to calculate the degree of integrated similarity by adding the degree of linguistic similarity and the likelihood in a predetermined ratio.

24. An apparatus according to claim 23, wherein said example search section is further configured to dynamically change a ratio in which the degree of linguistic similarity and the likelihood are added.

25. An apparatus for processing a natural language in which an input sentence is processed by using an example of an actual use of a language most similar to the input sentence, said apparatus comprising:

an example data base configured to store a plurality of examples of actual uses of a language;

an example search section configured to calculate a degree of similarity between the input sentence and each of the examples stored in said example data base and to select an example corresponding to a highest degree of similarity; and a speech synthesizer configured to generate an output sound corresponding to the selected example, wherein said example search section is further configured to calculate the degree of similarity by weighting some of the examples, said weighting being performed based on a context according to at least one of the examples previously selected, and wherein at least one of said plurality of examples comprises more than one word.

26. An apparatus according to claim 25, wherein said example data base is further configured to store prediction information for predicting some of the examples likely to be used for a next processing, and wherein said example search section is further configured to perform said weighting based on the prediction information.

27. An apparatus according to claim 26, wherein said example data base is further configured to store as the prediction information a group of information in which the example presently used for processing is related to some of the examples likely to be used for the next processing, and wherein said example search section is further configured to perform weighting so that the degree of similarity of some of the examples related the example used in a preceding processing increases or the degree of similarity of some of the examples not related the example used in a preceding processing decreases.

28. An apparatus according to claim 26, wherein said example data base is further configured to store a group of information in which some of the examples likely to be used for the next processing are related to one of the examples presently used, the group of information being obtained by learning.

29. An apparatus according to claim 26, wherein said example data base is further configured to store the prediction information by sorting the examples in the prediction information into groups of examples used in correspondence with predetermined places, and wherein said example search section is further configured to use the prediction information according to each of the predetermined places.

* * * * *